United States Patent
Wang et al.

(10) Patent No.: US 12,343,805 B2
(45) Date of Patent: Jul. 1, 2025

(54) PNEUMATIC VIBRATION DEVICE WITH ROTATABLE PISTON SHAFT

(71) Applicant: SHENZHEN SUPERLINE TECHNOLOGY CO., LTD., Guangdong (CN)

(72) Inventors: Zhong Wang, Guangdong (CN); Jing Song Zhou, Guangdong (CN)

(73) Assignee: SHENZHEN SUPERLINE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/039,253

(22) PCT Filed: Apr. 24, 2022

(86) PCT No.: PCT/CN2022/088765
§ 371 (c)(1),
(2) Date: May 29, 2023

(87) PCT Pub. No.: WO2023/201764
PCT Pub. Date: Oct. 26, 2023

(65) Prior Publication Data
US 2025/0073787 A1    Mar. 6, 2025

(30) Foreign Application Priority Data
Apr. 21, 2022    (CN) .......................... 202210425451.4

(51) Int. Cl.
*B23B 47/00*    (2006.01)
*B06B 1/18*    (2006.01)

(52) U.S. Cl.
CPC .............. *B23B 47/00* (2013.01); *B06B 1/183* (2013.01); *B06B 2201/73* (2013.01)

(58) Field of Classification Search
CPC ...... B06B 1/183; B06B 2201/73; B23B 47/00
See application file for complete search history.

(56) References Cited

U.S. PATENT DOCUMENTS 271,781 A * 2/1883 Brazelle .................... E21B 4/14
173/127
422,051 A * 2/1890 Drautz ...................... E21B 4/14
91/232
(Continued)

FOREIGN PATENT DOCUMENTS

CH    524756    6/1972
CN    101259543    9/2008
(Continued)

OTHER PUBLICATIONS

"International Search Report (Form PCT/ISA/210) of PCT/CN2022/088765", mailed on Dec. 19, 2022, pp. 1-4.
(Continued)

*Primary Examiner* — Joshua G Kotis
*Assistant Examiner* — Scott A Howell
(74) *Attorney, Agent, or Firm* — JEEN IP LAW, LLC (57) ABSTRACT

A pneumatic vibration device with a rotatable piston shaft comprises a piston body and a gas diverter. The piston body comprises a piston shaft, an input shaft and a piston cylinder body. The piston shaft comprises a hollow spindle with two ends connected to a first piston and a second piston through connection bearings respectively. The first piston and the second piston are connected through an inner sleeve. The spindle is connected to a rotary connection member. The input shaft stretches into the inner sleeve and is matched and connected with the rotary connection member. The gas diverter comprises a first gas diversion port and a second diversion port. The pneumatic vibration device is compact in structure and high in adaptability, and can realize rotation and vibration of drilling tools.

10 Claims, 7 Drawing Sheets

(56) References Cited

U.S. PATENT DOCUMENTS

| | | | | |
|---|---|---|---|---|
| 3,007,524 A * | 11/1961 | Boer | ........................ | E21B 34/10 |
| | | | | 166/322 |
| 4,448,262 A * | 5/1984 | Vincent | .................... | B25D 9/08 |
| | | | | 91/401 |
| 4,722,385 A * | 2/1988 | Yamauchi | ............ | B22D 17/145 |
| | | | | 425/420 |
| 8,640,787 B2 * | 2/2014 | Rohrer | ...................... | E02D 7/10 |
| | | | | 173/114 |
| 11,149,495 B2 * | 10/2021 | Campbell | ............... | E21B 17/07 |
| 2015/0308421 A1 | 10/2015 | Vogt | | |
| 2018/0010389 A1 * | 1/2018 | Campbell | ................. | E21B 4/14 |

FOREIGN PATENT DOCUMENTS

| | | |
|---|---|---|
| CN | 201618992 | 11/2010 |
| CN | 202824756 | 3/2013 |
| CN | 103128339 | 6/2013 |
| CN | 103691992 | 4/2014 |
| CN | 107104514 | 8/2017 |
| CN | 108213508 | 6/2018 |
| CN | 211866675 | 11/2020 |
| CN | 213189917 | 5/2021 |
| CN | 113057744 | 7/2021 |
| CN | 215318496 | 12/2021 |

OTHER PUBLICATIONS

"Written Opinion of the International Searching Authority (Form PCT/ISA/237) of PCT/CN2022/088765", mailed on Dec. 19, 2022, pp. 1-4.

* cited by examiner

PNEUMATIC VIBRATION DEVICE WITH ROTATABLE PISTON SHAFT

CROSS-REFERENCE TO RELATED APPLICATION

This application is a 371 of international application of PCT application serial no. PCT/CN2022/088765, filed on Apr. 24, 2022, which claims the priority benefit of China application no. 202210425451.4, filed on Apr. 21, 2022. The entirety of each of the above mentioned patent applications is hereby incorporated by reference herein and made a part of this specification.

TECHNICAL FIELD

The invention relates to a vibration device, in particular to a pneumatic vibration device with a rotatable piston shaft.

RELATED ART

When long and deep holes are drilled, tiny axial vibrations can be applied to a drilling tool to realize discontinuous cutting, such that cuttings can be discharged easily, the cutting force can be drastically reduced, the drilling tool can be effectively prevented from being fractured, and the quality of the inner surface of the holes can be improved. At present, much technical information about machining devices capable of realizing vibration and rotation has been disclosed. For example, Chinese Patent Application No. CN107104514A, entitled Surrounding Type Wireless Power Transmission System Suitable for Automatic Tool Changing of Ultrasonic Machining Center, discloses that a piezoelectric ceramic vibrator is disposed on a rotary shaft of a motor to rotate together with the rotary shaft, and power is supplied to a transducer in a non-contact manner through coil coupling to realize rotation and vibration of a tool. Chinese Patent Application No. CN108213508A, entitled Ultrasonic Hand Drill using Bearings for Power Supply, uses needle bearings to supply power to an ultrasonic vibrator. In these two patents, the ultrasonic vibrator is disposed on a rotary shaft capable of rotating to realize rotation and vibration at the same time. However, to realize good vibration of the rotary shaft and the tool driven by the rotary shaft, the piezoelectric ultrasonic should be large enough, which leads to an excessively large size of the structure and makes it impossible to realize a small structure.

Chinese Patent Application No. CN113057744A, entitled Root Canal Therapy Device with Mechanical Vibration Driving Mode and Rotation Driving Mode, discloses that the vibration of a rotating shaft is realized through an eccentric shaft and a lever ring, and the eccentric shaft rotates to drive the lever ring to vibrate. However, when such a structure works, mechanical friction will be generated between the eccentric shaft and the lever ring and a friction pair is easy to wear, so the material requirement is high, and fabrication is difficult.

SUMMARY OF INVENTION

In view of the abovementioned technical problems, the invention discloses a pneumatic vibration device with a rotatable piston shaft.

The technical solution adopted by the invention is as follows:
a pneumatic vibration device with a rotatable piston shaft comprises a piston body and a gas diverter;
the piston body comprises a piston shaft, an input shaft and a piston cylinder body, the piston shaft is located in the piston cylinder body and comprises a hollow spindle, two ends of the spindle are connected to a first piston and a second piston through connection bearings respectively, the first piston and the second piston are connected through an inner sleeve located outside the spindle, the spindle is connected to a rotary connection member, and the rotary connection member is located between the first piston and the second piston and is located in the inner sleeve; the input shaft sequentially penetrates through the piston cylinder body and the inner sleeve to be matched and connected with the rotary connection member;
a side wall of the first piston and a side wall of the second piston are connected to the piston cylinder body in a sliding and sealing manner, a first piston cavity and a second piston cavity are formed between the side wall of the first piston and the piston cylinder body, as well as between the side wall of the second piston and the piston cylinder body, and the piston cylinder body is provided with a first gas hole communicated with the first piston cavity and a second gas hole communicated with the second piston cavity;
the gas diverter comprises a first gas diversion port and a second gas diversion port, and the first gas diversion port and the second gas diversion port are communicated with the first gas hole and the second gas hole respectively.

Wherein, the first piston and the second piston are in dynamic seal fit with the spindle, such that the pistons can move, and the spindle can move with respect to the pistons.

By adopting this technical solution, a tool, such as a drilling tool, can be installed in a hollow part of the spindle, and the gas diverter can supply gas to the first gas diversion port and the second gas diversion port alternately to push the piston shaft to vibrate upwards and downwards, so as to drive the drilling tool to vibrate; and the input shaft drives the piston shaft to rotate, such that the piston shaft can rotate to drive the drilling tool to rotate. In this way, the drilling tool both can rotate and vibrate.

Wherein, the vibration frequency of the piston shaft is determined by the rotational speed of the gas diversion shaft of the gas diverter and thus can be controlled by adjusting the gas diverter, such that the piston shaft can vibrate at a high frequency such as 60,000 revolutions per minutes. In addition, the vibratory impact force of the piston shaft is determined by the pressure of input external pressure gas, so the vibratory impact force of the piston shaft can be controlled by adjusting the pressure of the external pressure gas. Finally, the rotational speed and torque of the piston shaft are determined by a driving mechanism connected to the input shaft, so the rotational speed and torque of the piston shaft can be controlled by controlling the driving mechanism.

As a further improvement of the invention, the input shaft comprises a driving shaft and an input shaft sleeve, the driving shaft is located in the input shaft sleeve and is rotatably connected to the input shaft sleeve, one end of the driving shaft is provided with a driving connector matched and connected with the rotary connection member, and the other end of the driving shaft is connected to a driving mechanism.

As a further improvement of the invention, a front end of the input shaft sleeve is secured and connected to an opening in the inner sleeve, such that the driving connector at the front end of the driving shaft can be matched with the rotary connecting member on the spindle, and the input shaft will vibrate synchronously when the piston shaft vibrates.

As a further improvement of the invention, the other end of the driving shaft is connected to the driving mechanism through a power input shaft head, and the driving shaft is connected to the input shaft sleeve through a driving connection bearing. Further, the driving mechanism is a motor. By adopting this technical solution, the driving mechanism can drive the driving shaft to rotate through the cooperation of the input shaft head and the driving mechanism, so as to drive the piston shaft to rotate, such that both rotation and vibration of the piston shaft are realized.

As a further improvement of the invention, the rotary connection member and the driving connector are bevel gears.

As a further improvement of the invention, the first piston is provided with a first center hole, the second piston is provided with a second center hole, and the two ends of the spindle stretch out of the first center hole and the second hole respectively; and the first piston is provided with a first step, the second piston is provided with a second step, and two ends of the inner sleeve are secured and connected to the first step and the second step respectively, such that the first piston and the second piston are integrated. In this way, the spindle can rotate with respect to the first piston and the second piston and cannot move in the axial direction.

As a further improvement of the invention, inner rings of the connection bearings are in interference fit with the spindle, and outer rings of the connection bearings are in interference fit with the first piston and the second piston respectively.

As a further improvement of the invention, the spindle is provided with shock pads, which are located on an outer side of the first piston and an outer side of the second piston respectively.

As a further improvement of the invention, the piston cylinder body comprises a piston cylinder, a first end cover and a second end cover, the first end cover and the second end cover are in close fit and connection with two ends of the piston cylinder respectively, the first end cover is provided with a first end cover center hole, the second end cover is provided with a second end cover center hole, the two ends of the spindle penetrate through the first end cover center hole and the second end cover center hole respectively and are in dynamic seal fit with the first end cover center hole and the second end cover center hole, and the spindle of the piston shaft is able to slide in the first end cover center hole and the second end cover center hole; and the first piston and the second piston are in dynamic seal fit with the piston cylinder. Wherein, a hole is formed in a side wall of the piston cylinder to allow the input shaft to penetrate through.

As a further improvement of the invention, the gas diverter comprises a gas diversion shaft and a jacket, the gas diversion shaft is located in the jacket and is rotatably connected to the jacket, and a tail end of the gas diversion shaft is connected to a rotary driving mechanism.

The first gas diversion port and the second gas diversion port are formed in the jacket, and a gas inlet, a first gas outlet and a second gas outlet are formed in the jacket.

A first gas intake duct, a second gas intake duct, a first gas discharge duct and a second gas discharge duct are disposed on the gas diversion shaft, the first gas intake duct and the second gas intake duct are located on two sides of the gas diversion shaft and are vertically staggered in an axial direction of the gas diversion shaft, the first gas intake duct and the second gas discharge duct vertically correspond to each other in the axial direction of the gas diversion shaft, and on an opposite side of the gas diversion shaft, the first gas discharge duct and the second gas intake duct vertically correspond to each other in the axial direction of the gas diversion shaft; when the rotary driving mechanism drives the gas diversion shaft to rotate, the gas inlet is communicated with the first gas intake duct and the second gas intake duct alternately; and the first gas intake duct is communicated with the first gas diversion port and the first gas discharge duct is communicated with the second gas diversion port and the second gas outlet, and then the second air intake duct is communicated with the second gas diversion port and the second gas discharge duct is communicated with the first gas diversion port and the first gas outlet. Wherein, the gas inlet of the gas diverter is connected to external pressure gas, the first gas diversion port is communicated with the first piston cavity, the second diversion port is communicated with the second piston cavity, and the first gas outlet and the second gas outlet are communicated with the outside atmosphere.

By adopting this technical solution, when the pneumatic vibration device works, the external pressure gas is continuously supplied through the gas inlet, and the pressure gas enters the first piston cavity through the first gas intake duct and the first gas diversion port of the gas diverter and the first gas hole, such that the pressure in the first piston cavity is increased; at this moment, gas in the second piston cavity is discharged through the second gas hole of the piston body, the first gas discharge duct of the gas diverter, and the first gas outlet in the jacket of the gas diverter, such that the pressure in the second piston cavity is reduced. The piston body is driven by a pressure difference between the first piston cavity and the second piston cavity to move downwards. With the rotation of the gas diversion shaft of the gas diverter, when the first gas intake duct is communicated with the second gas diversion port and the second gas discharge duct is communicated with the first gas diversion port, the gas is reversed, such that the pressure in the second piston cavity is increased, the pressure in the first piston cavity is reduced, and the piston body moves upwards. The piston body vibrates with the periodical rotation of the gas diversion shaft.

As a further improvement of the invention, the gas diverter comprises a gas diversion shaft and a jacket, the gas diversion shaft is located in the jacket and is rotatably connected to the jacket, and a tail end of the gas diversion shaft is connected to a rotary driving mechanism; the first gas diversion port and the second gas diversion port are formed in the jacket, and a gas inlet, a first gas outlet and a second gas outlet are formed in the jacket.

A first gas intake duct, a second gas intake duct and a gas discharge duct are disposed on the gas diversion shaft, the first gas intake duct and the second gas intake duct are located on two sides of the gas diversion shaft and are vertically staggered in an axial direction of the diversion shaft, and the first gas intake duct and the gas discharge duct vertically correspond to each other in the axial direction of the gas diversion shaft; when the rotary driving mechanism drives the gas diversion shaft to rotate, the gas inlet is communicated with the first gas intake duct and the second gas intake duct alternately, the first gas intake duct is communicated with the first gas diversion port, the gas discharge duct is communicated with the second gas diversion port and the second gas discharge port, and then the second gas intake duct is communicated with the second gas diversion port. Wherein, the first gas outlet and the second gas outlet are communicated with the outside atmosphere.

By adopting this technical solution, that is, by omitting the second air discharge duct, when the pneumatic vibration device works, the pressure in the first piston cavity is increased periodically and is not released and the pressure in the second piston cavity is increased and released periodically, with the rotation of the gas diversion shaft of the gas diverter. In this way, a large downward impact force and a small upward impact force are generated when the piston shaft vibrates.

As a further improvement of the invention, the gas diversion shaft is installed in the jacket through a bearing, is able to rotate in the jacket, and is in dynamic seal and clearance fit with the jacket.

As a further improvement of the invention, the gas diverter may be electromagnetic and is used for alternately supplying external pressure gas to the first piston cavity and the second piston cavity of the piston body at a certain frequency. The structure of the electromagnetic gas diverter is not limited, and the alternate gas diversion frequency of the electromagnetic gas diverter can be adjusted.

As a further improvement of the invention, circular grooves are formed in a side face of the first piston and a side face of the second piston, elastic membranes are inlaid in the circular grooves, and the first piston and the second piston are in seal connection with the piston cylinder body through the corresponding elastic membranes. By adopting this technical solution, when the piston shaft vibrates, the elastic membranes can deform to realize small vibration. This design is effective for small vibration, and the piston machining difficulty is greatly reduced.

Further, the elastic membrane may be made of a polymer material or a metal material.

Compared with the prior art, the invention has the following beneficial effects:

By adopting the technical solution of the invention, the piston shaft can rotate while vibrating, so using is more convenient; the pneumatic vibration device is compact in structure and high in adaptability, the vibration frequency can be controlled, the vibratory impact force can be adjusted, the rotational speed and torque of the piston shaft can be controlled, the cuttings discharge capacity of a drilling tool can be effectively improved, the cutting resistance and the cutting temperature can be reduced, the surface quality of deep holes can be improved effectively, and the service life of the drilling tool can be prolonged effectively; and the pneumatic vibration device can be used for drilling of long and deep holes and can also be used for connection and driving of mechanical equipment for the orthopedics department and the dental department.

DESCRIPTION OF EMBODIMENTS

The invention will be further described below in conjunction with accompanying drawings and specific embodiments.

As shown in FIG. 1-FIG. 6, a pneumatic vibration device with a rotatable piston shaft comprises a piston body 1 and a gas diverter 2. The piston body 1 comprises a piston shaft A1, an input shaft A2, and a piston cylinder body A3.

Figure 3:
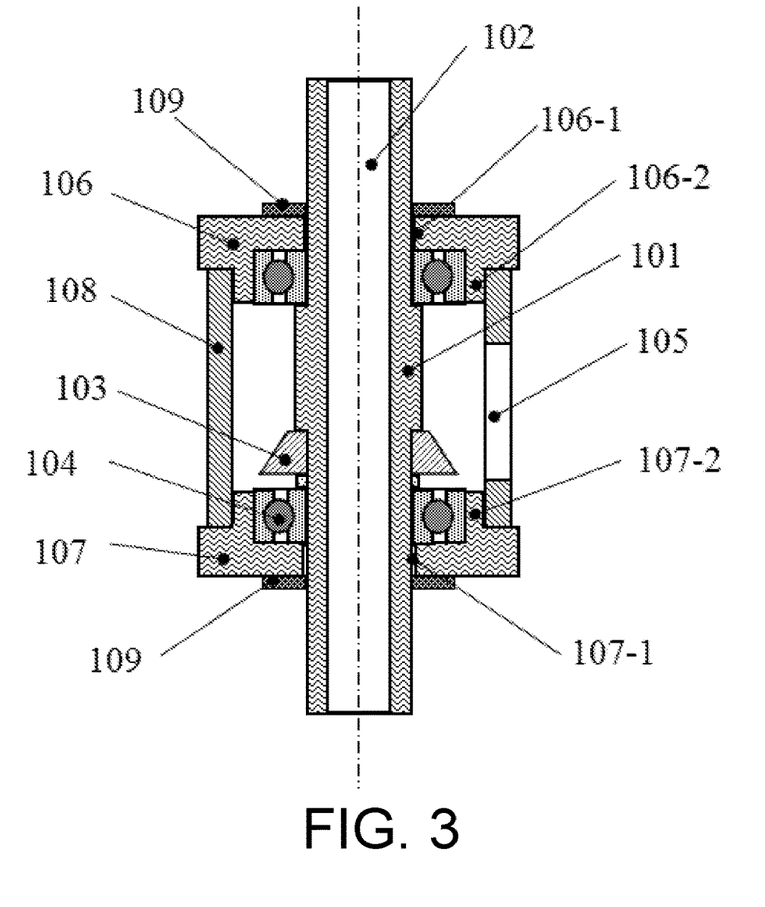
FIG. 3 is a structural diagram of a piston shaft according to Embodiment 1 of the invention.
Figure 4:
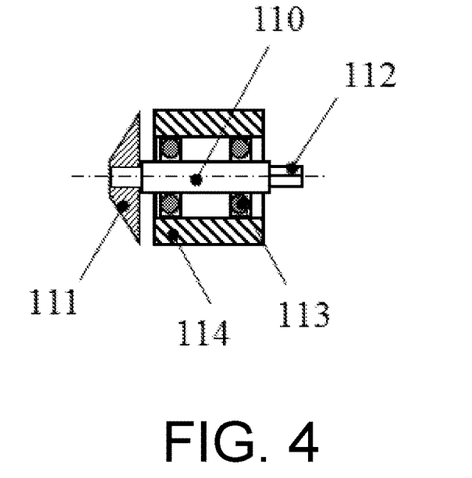
FIG. 4 is a structural diagram of an input shaft according to Embodiment 1 of the invention.

As shown in FIG. 3, the piston shaft A1 comprises a hollow spindle 101, and a through hole 102 is formed in the spindle 101 to allow a drilling tool to be installed therein. A bevel gear 103 is secured and installed in the middle of the spindle 101, connection bearings 104 are installed at an upper end and a lower end of the spindle 101, and inner rings of the connection bearings 104 are in interference fit with the spindle 101; and a first piston 106 and a second piston 107 are installed on the connection bearings 104 at the upper end and the lower end of the spindle 101 respectively, and the first piston 106 and the second piston 107 are in interference fit with outer rings of the connection bearings 104. A first piston center hole 106-1 and a second piston center hole 107-1 are formed in the first piston 106 and the second piston 107 respectively. The spindle 101 penetrates through the first piston center hole 106-1 and the second piston center hole 107-1, and the first piston center hole 106-1 and the second piston center hole 107-1 are in dynamic seal fit with the spindle 101, such that the first piston 106, the second piston 107 and the spindle 101 can rotate relatively. A first piston step 106-2 and a second piston step 107-2 are disposed on an outer side of the first piston 106 and an outer side of the second piston 107 respectively, and an inner sleeve 108 is secured and connected to the first piston step 106-2 and the second piston step 107-2, such that the first piston 106 and the second piston 107 are integrated, and the spindle 101 can rotate with respect to the first piston 106 and the second piston 107 and cannot move in the axial direction. Shock pads 109 are disposed at the upper end and the lower end of the spindle 101 respectively and are located on an outer surface of the first piston 106 and an outer surface of the second piston 107 respectively. An opening 105 is formed in the inner sleeve 108 to allow the input shaft A2 to penetrate through.

Figure 1:
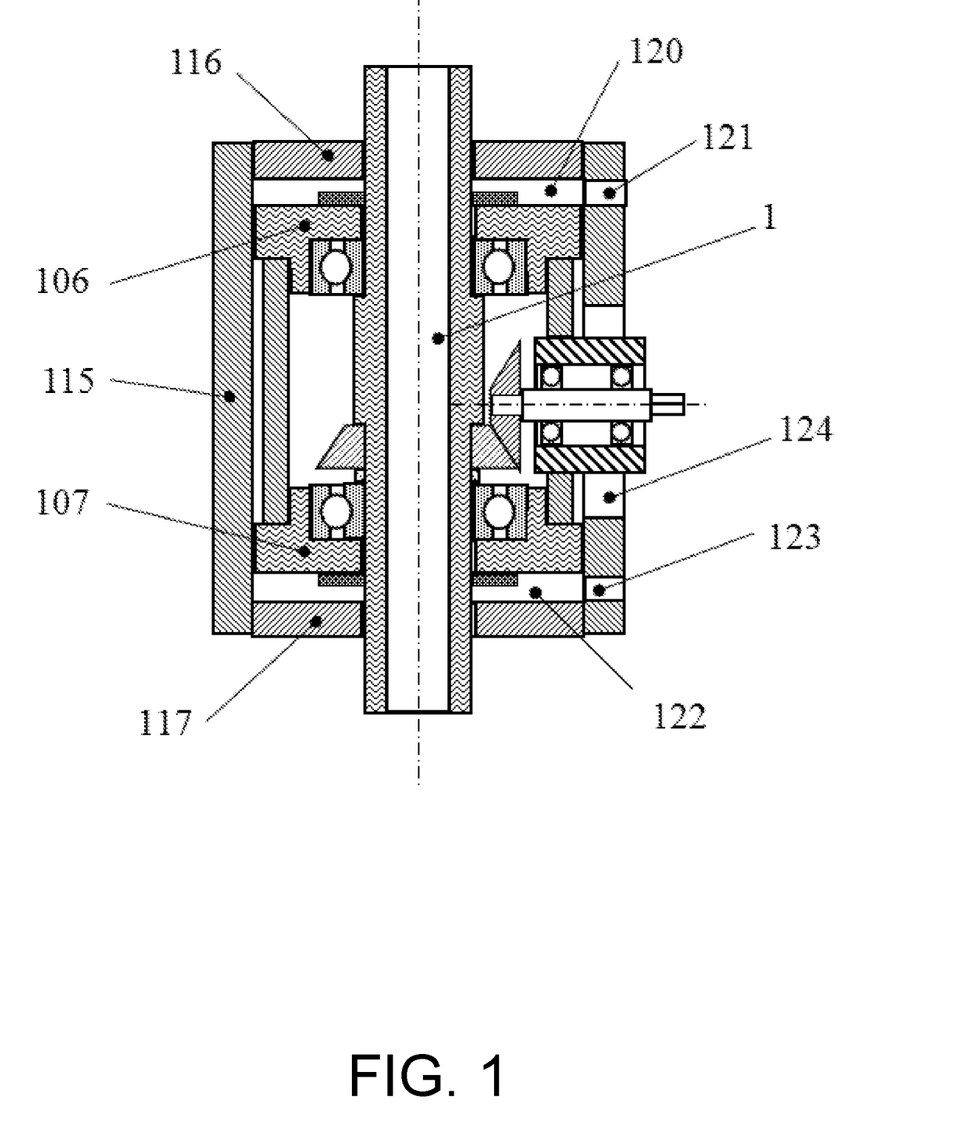
FIG. 1 is a structural diagram of a piston body of a pneumatic vibration device with a rotatable piston shaft according to Embodiment 1 of the invention.

As shown in FIG. 3, the input shaft A2 comprises a driving shaft 110, a driving bevel gear 111 engaged with the bevel gear 103 is fixedly installed at a front end of the driving shaft 110, and a power input shaft head 112 is disposed at a rear end of the driving shaft 110 to be matched with a motor. The driving shaft 110 is installed in an input shaft sleeve 114 through a bearing 113. A front end of the input shaft sleeve 114 is secured and connected to the opening 105 formed in the inner sleeve 108, such that the bevel gear 103 and the driving bevel gear 111 are engaged, as shown in FIG. 1. Moreover, the input shaft sleeve 114 of the input shaft A2 is fixedly connected to the inner sleeve 108 of the piston shaft A1, so the input shaft A2 vibrates synchronously when the piston shaft A1 vibrates.

Figure 5:
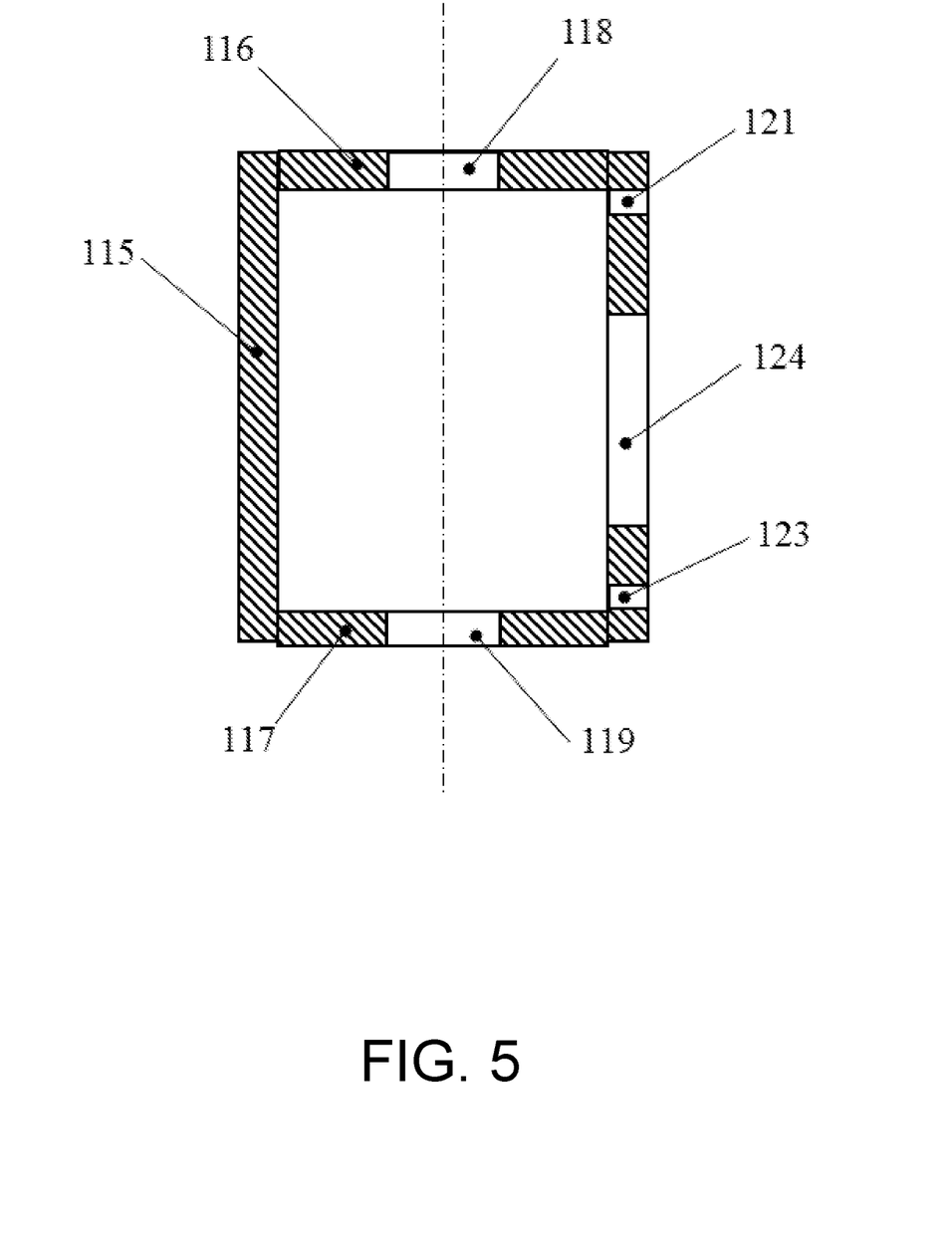
FIG. 5 is a structural diagram of a piston cylinder body according to Embodiment 1 of the invention.

As shown in FIG. 1 and FIG. 5, the piston cylinder body A3 comprises a piston cylinder 115, a first end cover 116, and a second end cover 117. The first end cover 116, the second end cover 117 and the piston cylinder 115 are in close fit with each other, a first end cover center hole 118 and a second end cover center hole 119 are formed in the first end cover 116 and the second end cover 117 respectively, the upper end and the lower end of the spindle 101 penetrate through the first end cover center hole 118 and the second end cover center hole 119 respectively, and the spindle 101 is in dynamic seal fit with the first end cover center hole 118 and the second end cover center hole 119, such that the spindle 101 can slide in the first end cover center hole 118 and the second end cover center hole 119.

A first piston cavity 120 is formed between the first piston 106 and the first end cover 116, and a first gas hole 121 is formed in a position, corresponding to the first piston cavity 120, of a side wall of the piston cylinder 115. A second piston cavity 122 is formed between the second piston 107 and the second end cover 117, and a second gas hole 123 is formed in a position, corresponding to the second piston cavity 122, of the side wall of the piston cylinder 115. The first piston 106 and the second piston 107 are in dynamic seal fit with the piston cylinder 115, and in presence of a pressure difference between the first piston cavity 120 and the second piston cavity 122, the piston shaft A1 is drive to move upwards and downwards in the piston cylinder 115. A hole 124 is formed in the side wall of the piston cylinder 115 to allow the input shaft A2 to penetrate through.

Figure 2:
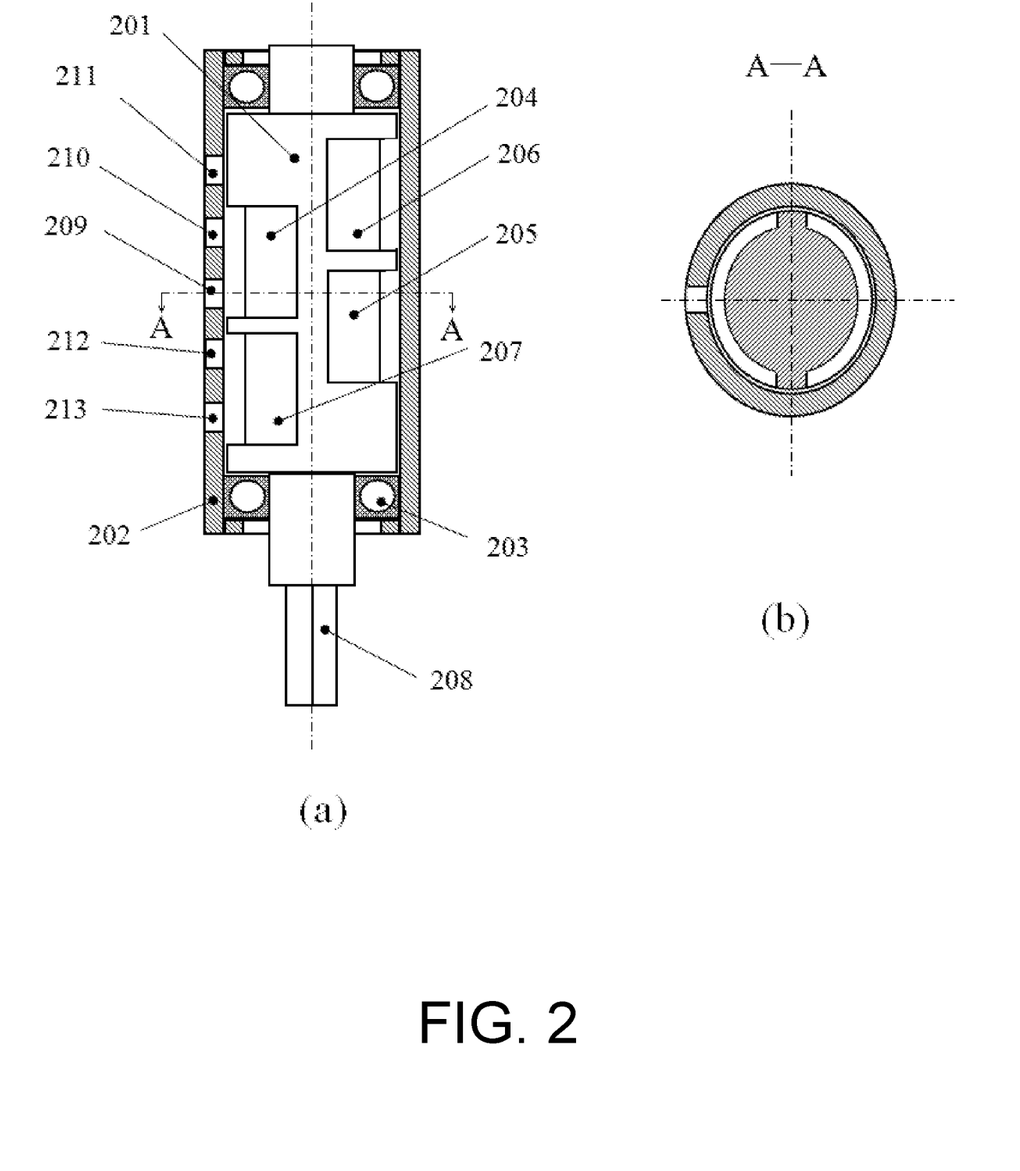
FIG. 2 is a structural diagram of a gas diverter according to Embodiment 1 of the invention, wherein (a) is a structural diagram of the gas diverter, and (b) is a sectional view along A-A in (a).

As shown in FIG. 2, the gas diverter 2 comprises a gas diversion shaft 201 and a jacket 202, wherein the gas diversion shaft 201 is installed in the jacket 202 through a bearing 203, is able to rotate in the jacket 202, and is in dynamic seal and clearance fit with the jacket 202. A first gas intake duct 204, a second gas intake duct 205, a first gas discharge duct 206 and a second gas discharge duct 207 are disposed on the gas diversion shaft 201, the first gas intake duct 204 and the second gas intake duct 205 are located on two sides of the gas diversion shaft 201 and are vertically staggered in an axial direction of the gas diversion shaft 201, the first gas intake duct 204 the second gas discharge duct 207 vertically correspond to each other in the axial direction of the gas diversion shaft 201, and on the other opposite side of the gas diversion shaft 201, the first gas discharge duct 206 and the second gas intake duct 205 vertically correspond to each other in the axial direction of the gas diversion shaft 201. As can be seen from FIG. 2(b) which is a sectional view along A-A in FIG. 2(a), the section of the first gas intake duct 204 and the section of the second gas intake duct 205 are axially symmetric. A connection shaft head 208 is disposed at a tail end of the gas diversion shaft 201 to be connected to a driving motor. A gas inlet 209, a first piston cavity gas supply hole 210, a first piston cavity gas discharge hole 211, a second piston cavity gas supply hole 212 and a second piston cavity gas discharge hole 213 are formed in the jacket 202.

Figure 6:
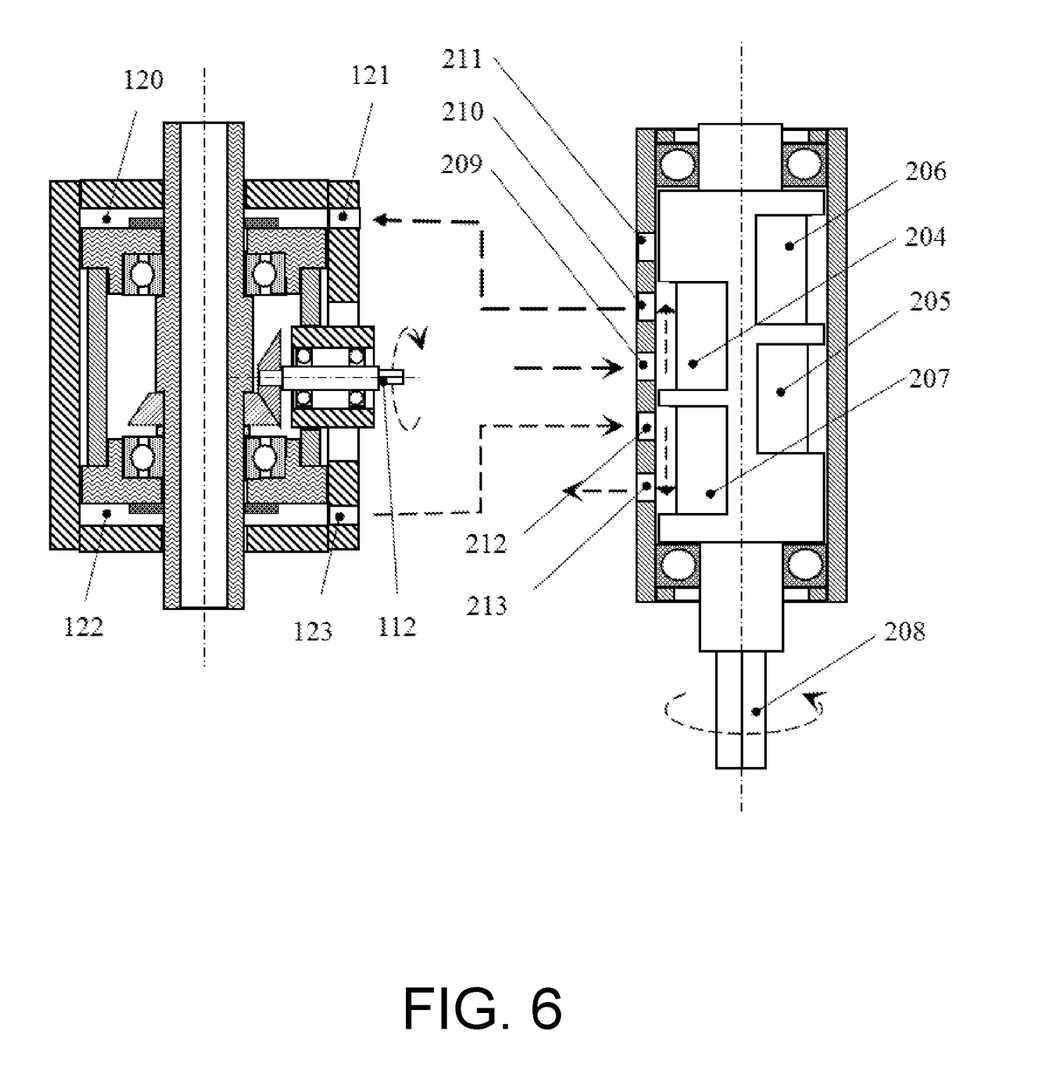
FIG. 6 is a schematic diagram of the working principle of Embodiment 1 of the invention.

As shown in FIG. 6, the gas inlet 209 of the gas diverter 2 is connected to external pressure gas, the first piston cavity gas supply hole 210 is connected to the first gas hole 121 of the piston cylinder body A3, the second piston cavity gas supply hole 212 is connected to the second gas hole 123 of the piston cylinder body A3, and the first piston cavity gas discharge hole 211 and the second piston cavity gas discharge hole 213 are communicated with the outside atmosphere.

When the pneumatic vibration device works, the external pressure gas is continuously supplied through the gas inlet 209, and the pressure gas passes through the first gas intake duct 204 and enters the first piston cavity 120 from the first piston cavity gas supply hole 210 through the first gas hole 121, such that the pressure in the first piston cavity 120 is increased; meanwhile, gas in the second piston cavity 122 enters the second gas discharge duct 207 through the second gas hole 123 and the second piston cavity gas supply hole 212; the second gas discharge duct 207 is communicated with the second piston cavity gas discharge hole 213, and the second piston cavity gas discharge hole 213 is connected to the atmosphere, so the gas in the second piston cavity 122 is discharged to the atmosphere, and the pressure in the second piston cavity 122 is released. At this moment, because the pressure in the first piston cavity 120 is increased and the pressure in the second piston cavity 122 is released, a pressure difference is formed between the first piston cavity 120 and the second piston cavity 122 to drive the piston shaft A1 to move downwards. When the gas diversion shaft 201 of the gas diverter 2 is driven by an external motor to rotate, the second gas intake duct 205 and the gas inlet 209 are communicated with the second piston cavity gas supply hole 212, and the first gas discharge duct 206 is communicated with the first piston cavity gas supply hole 210 and the first piston cavity gas discharge hole 211; at this moment, the pressure in the first piston cavity 120 is released, and the pressure in the second piston cavity 122 is increased, so a pressure difference is formed between the second piston cavity 122 and the first piston cavity 120 to drive the piston shaft A1 to move upwards. The gas diversion shaft 201 of the gas diverter 2 rotates periodically to repeat this process, such that the piston shaft A1 can vibrate upwards and downwards.

The pneumatic vibration device in this embodiment has the advantages of controllable vibration frequency, adjustable vibratory impact force, and controllable rotational speed and torque of the piston shaft, and the like; the cuttings discharge capacity of a drilling tool can be effectively improved, the cutting resistance and the cutting temperature can be reduced, the surface quality of deep holes can be improved effectively, and the service life of the drilling tool can be prolonged effectively; and the pneumatic vibration device is especially suitable for connection and driving of mechanical equipment for the orthopedics department and the dental department.

Embodiment 2

Figure 7:
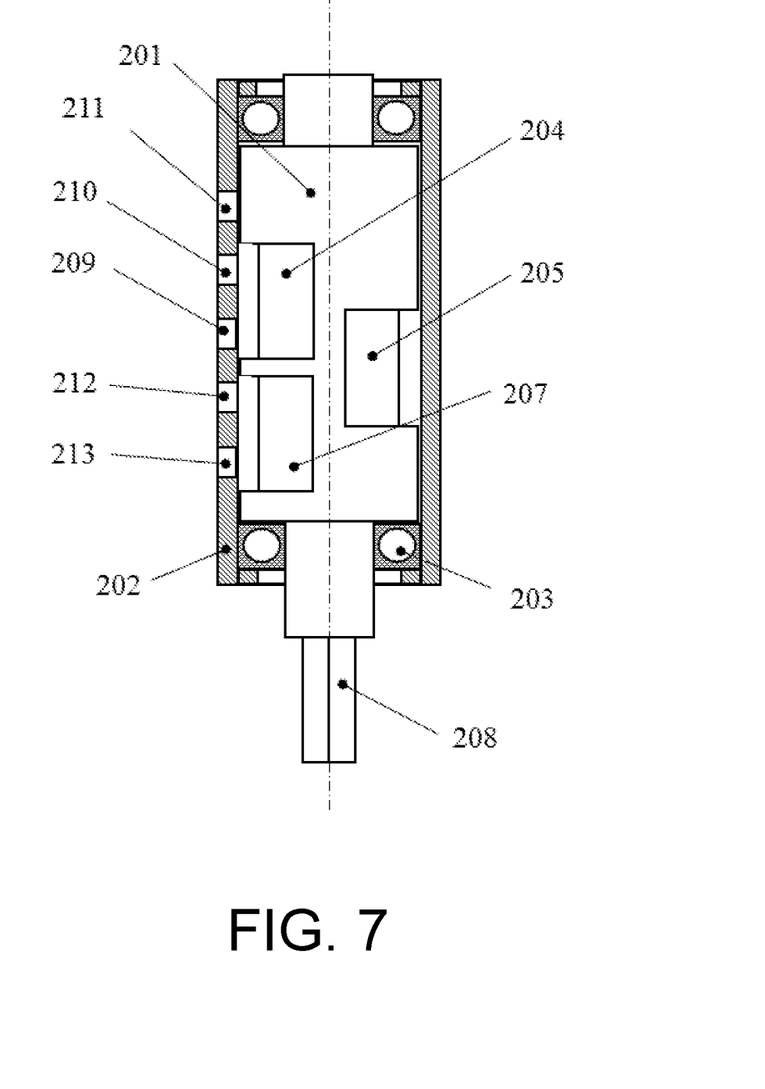
FIG. 7 is a structural diagram of a gas diverter with one gas discharge duct according to Embodiment 2 of the invention.

As shown in FIG. 7, on the basis of Embodiment 1, the pneumatic vibration device in this embodiment is not provided with the first gas discharge duct 206, such that when the device works, the pressure in the first piston cavity 120 is increased periodically and is not released and the pressure in the second piston cavity 122 is increased and released periodically, with the rotation of the gas diversion shaft 201 of the gas diverter 2. In this way, a large downward impact force and a small upward impact force are generated when the piston shaft A1 vibrates.

Further, the gas diverter 2 may be electromagnetic and is used for alternately supplying external pressure gas to the first piston cavity and the second piston cavity of the piston body at a certain frequency. The structure of the electromagnetic gas diverter is not limited, and the alternate gas diversion frequency of the electromagnetic gas diverter can be adjusted.

Embodiment 3

Figure 8:
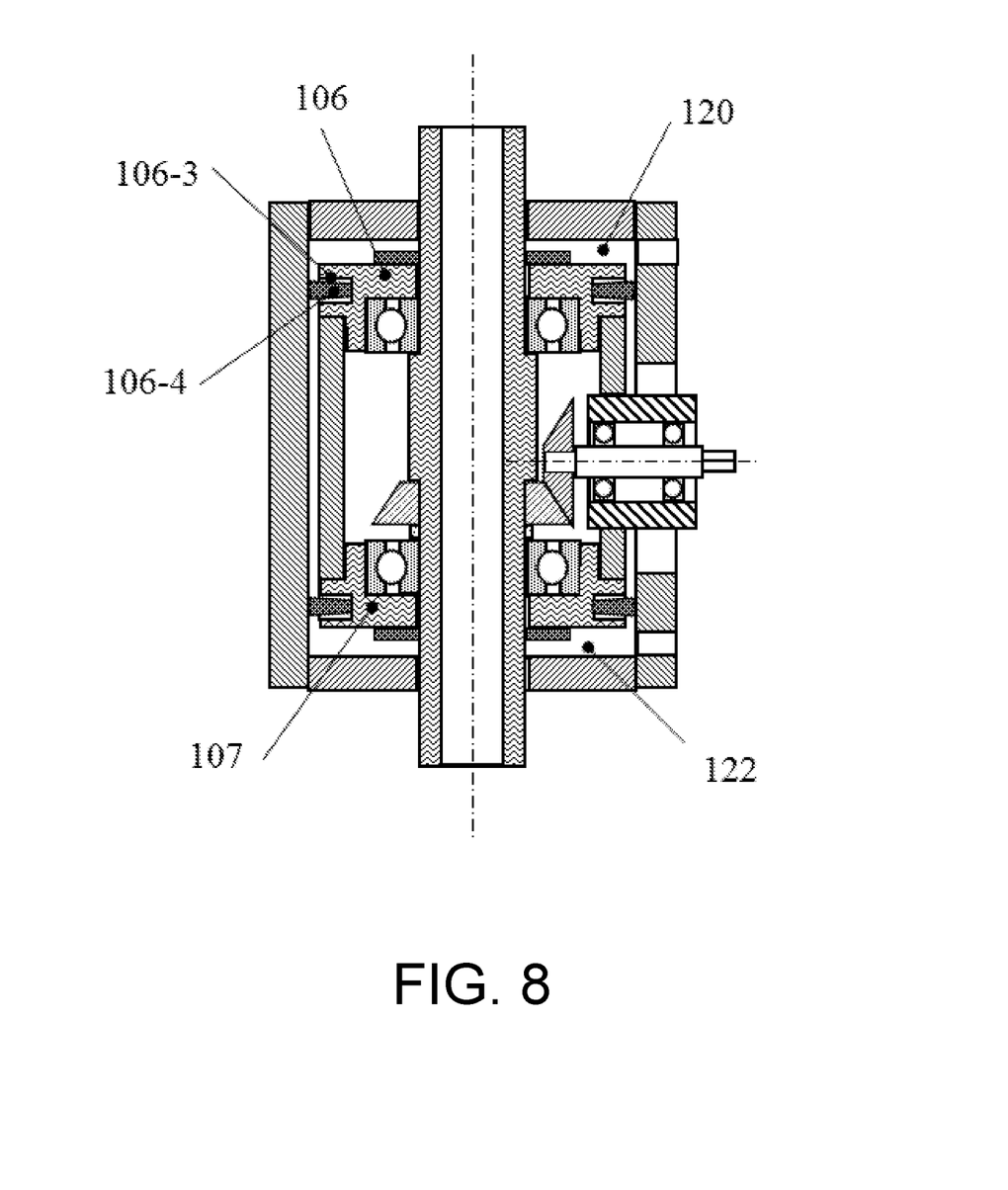
FIG. 8 is a structural diagram of a piston body according to Embodiment 3 of the invention.

As shown in FIG. 8, on the basis of Embodiment 1, the first piston 106 and the second piston 107 in this embodiment may each comprise a membrane structure. For example, a circular groove 106-3 is formed in a side face of the first piston 106, and an elastic membrane 106-4 is inlaid in the circular groove 106-3 to fulfill a supporting and sealing effect. When the piston shaft A1 vibrates, the elastic membrane 106-4 can deform. The second piston 107 is of the same structure as the first piston body 106.

This design is effective for small vibration, and the piston machining difficulty is greatly reduced.

Further, the elastic membrane 106-4 may be made of a polymer material or a metal material, and the structure and installation manner of the elastic membrane 106-4 are not limited.

It should be understood that, in the description of the invention, terms such as "upper", "lower". "front". "back", "left". "right", "vertical", "horizontal". "top". "bottom". "inner" and "outer" are used to indicate directional or positional relations based on the accompanying drawings merely for the purpose of facilitating and simplifying the description, and do not indicate or imply that a device or element referred to must be in a specific direction, or be configured and operated in a specific direction, and thus, they should not be construed as limitations of the invention.

In addition, terms such as "first" and "second" are merely for a descriptive purpose, and should not be construed as indicating or implying relative importance or the number of technical features referred to. Thus, when one feature is defined by "first" or "second", it may explicitly or implicitly indicate that one or more said feature is included. In the description of the invention, "multiple" refer to two or more, unless otherwise explicitly defined.

In the invention, unless otherwise expressly stated and defined, terms such as "install", "connect", "link" and "fix" should be broadly understood. For example, "connect" may refer to fixed connection, detachable connection, or integrated connection; or, mechanical connection or electrical connection; or, direct connection, indirect connection through an intermediate medium, or internal connection or interaction of two elements. Those ordinarily skilled in the art can appreciate the specific meaning of these terms in the invention as the case may be.

The invention is described in further detail above with reference to specific preferred embodiments, and the specific implementation of the invention is not limited to the above description. Various simple deductions or substitutions made by those ordinarily skilled in the art without departing from the concept of the invention should also fall within the protection scope of the invention.

What is claimed is:

1. A pneumatic vibration device with a rotatable piston shaft, comprising a piston body and a gas diverter, wherein the piston body comprises a piston shaft, an input shaft and a piston cylinder body, the piston shaft is located in the piston cylinder body and comprises a hollow spindle, two ends of the spindle are connected to a first piston and a second piston through connection bearings respectively, the first piston and the second piston are connected through an inner sleeve located outside the spindle, and the spindle is connected to a rotary connection member located between the first piston and the second piston; the input shaft sequentially penetrates through the piston cylinder body and the inner sleeve to be matched and connected with the rotary connection member;

a side wall of the first piston and a side wall of the second piston are connected to the piston cylinder body in a sliding and sealing manner, a first piston cavity and a second piston cavity are formed between the side wall of the first piston and the piston cylinder body, as well as between the side wall of the second piston and the piston cylinder body, and the piston cylinder body is provided with a first gas hole communicated with the first piston cavity and a second gas hole communicated with the second piston cavity;

the gas diverter comprises a first gas diversion port and a second gas diversion port, and the first gas diversion port and the second gas diversion port are communicated with the first gas hole and the second gas hole respectively.

2. The pneumatic vibration device with a rotatable piston shaft according to claim 1, wherein the input shaft comprises a driving shaft and an input shaft sleeve, the driving shaft is located in the input shaft sleeve and is rotatably connected to the input shaft sleeve, one end of the driving shaft is provided with a driving connector matched and connected with the rotary connection member, and the other end of the driving shaft is connected to a driving mechanism.

3. The pneumatic vibration device with a rotatable piston shaft according to claim 2, wherein the other end of the driving shaft is connected to the driving mechanism through a power input shaft head, and the driving shaft is connected to the input shaft sleeve through a driving connection bearing.

4. The pneumatic vibration device with a rotatable piston shaft according to claim 3, wherein the rotary connection member and the driving connector are bevel gears.

5. The pneumatic vibration device with a rotatable piston shaft according to claim 4, wherein the first piston is provided with a first center hole, the second piston is provided with a second center hole, and the two ends of the spindle stretch out of the first center hole and the second hole respectively; and the first piston is provided with a first step, the second piston is provided with a second step, and two ends of the inner sleeve are secured and connected to the first step and the second step respectively, such that the first piston and the second piston are integrated.

6. The pneumatic vibration device with a rotatable piston shaft according to claim 5, wherein inner rings of the connection bearings are in interference fit with the spindle, and outer rings of the connection bearings are in interference fit with the first piston and the second piston respectively.

7. The pneumatic vibration device with a rotatable piston shaft according to claim 5, wherein the spindle is provided with shock pads, which are located on an outer side of the first piston and an outer side of the second piston respectively.

8. The pneumatic vibration device with a rotatable piston shaft according to claim 1, wherein the piston cylinder body comprises a piston cylinder, a first end cover and a second end cover, the first end cover and the second end cover are in close fit and connection with two ends of the piston cylinder respectively, the first end cover is provided with a first end cover center hole, the second end cover is provided with a second end cover center hole, and the two ends of the spindle penetrate through the first end cover center hole and the second end cover center hole respectively and are in dynamic seal fit with the first end cover center hole and the second end cover center hole; and the first piston and the second piston are in dynamic seal fit with the piston cylinder.

9. The pneumatic vibration device with a rotatable piston shaft according to claim 1, wherein the gas diverter comprises a gas diversion shaft and a jacket, the gas diversion shaft is located in the jacket and is rotatably connected to the jacket, and a tail end of the gas diversion shaft is connected to a rotary driving mechanism;

the first gas diversion port and the second gas diversion port are formed in the jacket, and a gas inlet, a first gas outlet and a second gas outlet are formed in the jacket;

a first gas intake duct, a second gas intake duct, a first gas discharge duct and a second gas discharge duct are disposed on the gas diversion shaft, the first gas intake duct and the second gas intake duct are located on two sides of the gas diversion shaft and are vertically staggered in an axial direction of the gas diversion shaft, the first gas intake duct and the second gas discharge duct vertically correspond to each other in the axial direction of the gas diversion shaft, and on an opposite side of the gas diversion shaft, the first gas discharge duct and the second gas intake duct vertically correspond to each other in the axial direction of the gas diversion shaft; when the rotary driving mechanism drives the gas diversion shaft to rotate, the gas inlet is communicated with the first gas intake duct and the second gas intake duct alternately; and the first gas intake duct is communicated with the first gas diversion port and the first gas discharge duct is communicated with the second gas diversion port and the second gas outlet, and then the second air intake duct is communicated with the second gas diversion port and the second gas discharge duct is communicated with the first gas diversion port and the first gas outlet;

or, a first gas intake duct, a second gas intake duct and a gas discharge duct are disposed on the gas diversion shaft, the first gas intake duct and the second gas intake duct are located on two sides of the gas diversion shaft and are vertically staggered in an axial direction of the diversion shaft, and the first gas intake duct and the gas discharge duct vertically correspond to each other in the axial direction of the gas diversion shaft; when the rotary driving mechanism drives the gas diversion shaft to rotate, the gas inlet is communicated with the first gas intake duct and the second gas intake duct alternately, the first gas intake duct is communicated with the first gas diversion port, the gas discharge duct is communicated with the second gas diversion port and the second gas discharge port, and then the second gas intake duct is communicated with the second gas diversion port.

10. The pneumatic vibration device with a rotatable piston shaft according to claim 1, wherein circular grooves are formed in a side face of the first piston and a side face of the second piston, elastic membranes are inlaid in the circular grooves, and the first piston and the second piston are in seal connection with the piston cylinder body through the corresponding elastic membranes.

* * * * *